United States Patent
Kift et al.

(10) Patent No.: US 8,920,636 B2
(45) Date of Patent: Dec. 30, 2014

(54) METHODS OF TRANSPORTING VARIOUS BITUMEN EXTRACTION PRODUCTS AND COMPOSITIONS THEREOF

(75) Inventors: Julian Kift, Reno, NV (US); Mahendra Joshi, Katy, TX (US)

(73) Assignee: Shell Canada Energy and Chervon Canada Limited, Calgary, Alberta (CA)

( * ) Notice: Subject to any disclaimer, the term of this patent is extended or adjusted under 35 U.S.C. 154(b) by 306 days.

(21) Appl. No.: 13/524,303

(22) Filed: Jun. 15, 2012

(65) Prior Publication Data

US 2013/0006026 A1 Jan. 3, 2013

Related U.S. Application Data

(60) Provisional application No. 61/502,031, filed on Jun. 28, 2011.

(51) Int. Cl.
| | | |
|---|---|---|
| C10G 1/04 | (2006.01) | |
| C10C 3/00 | (2006.01) | |
| C08K 5/01 | (2006.01) | |
| C08L 95/00 | (2006.01) | |
| F17D 1/08 | (2006.01) | |
| F17D 1/17 | (2006.01) | |
| C10G 1/00 | (2006.01) | |

(52) U.S. Cl.
CPC ... C08K 5/01 (2013.01); C10G 1/04 (2013.01); C08L 95/00 (2013.01); F17D 1/08 (2013.01); F17D 1/17 (2013.01); C10G 1/002 (2013.01); C10G 2300/302 (2013.01); C10G 2300/08 (2013.01); C10G 2300/44 (2013.01)
USPC ............... 208/390; 208/45; 585/1

(58) Field of Classification Search
USPC ...................... 585/1; 208/45, 390
See application file for complete search history.

(56) References Cited

U.S. PATENT DOCUMENTS

| | | |
|---|---|---|
| 2,871,180 A | 1/1959 | Lowman et al. |
| 3,131,141 A | 4/1964 | West |
| 3,484,365 A | 12/1969 | Pitchford |
| 3,527,692 A | 9/1970 | Titus |
| 3,565,593 A | 2/1971 | Moore et al. |
| 3,565,594 A | 2/1971 | Moore |
| 3,779,902 A | 12/1973 | Mitchell et al. |
| 4,035,282 A | 7/1977 | Stuchberry et al. |
| 4,046,668 A | 9/1977 | Farcasiu et al. |
| 4,054,506 A | 10/1977 | Hart, Jr. et al. |
| 4,120,773 A | 10/1978 | Ridgway |

(Continued)

FOREIGN PATENT DOCUMENTS

| | | |
|---|---|---|
| CA | 2224615 | 6/1999 |
| WO | WO 2007/102819 | 9/2007 |
| WO | WO 2011/082209 | 7/2011 |

OTHER PUBLICATIONS

Acetone MSDS, Sigma-Aldrich, Apr. 19, 2012 (8 pp.).
Benzene MSDS, Sigma-Aldrich, Apr. 27, 2012 (9 pp.).
Biodiesel Processing, Mar. 22, 2004 (3 pp.).

(Continued)

*Primary Examiner* — Ellen McAvoy

(57) ABSTRACT

Methods for transporting bitumen extraction product include providing bitumen-laden aromatic solvent, providing bitumen-laden paraffinic solvent, and blending the two materials. The resulting mixture can be transported through existing pipeline infrastructure and can use existing separation processing equipment, and thereby avoids the need for separate infrastructure for each composition. Combining the two compositions can also avoid undesirable asphaltene precipitation.

9 Claims, 2 Drawing Sheets

(56) References Cited

U.S. PATENT DOCUMENTS

Figure 1:
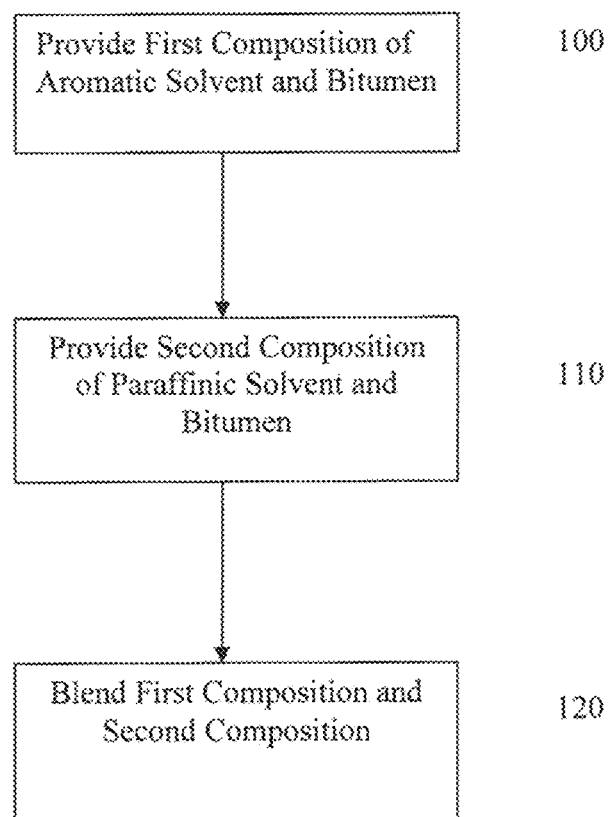

| | | |
|---|---|---|
| 4,120,777 A | 10/1978 | Globus |
| 4,139,450 A | 2/1979 | Hanson et al. |
| 4,222,873 A | 9/1980 | Parsons |
| 4,224,138 A | 9/1980 | Kruyer |
| 4,250,016 A | 2/1981 | Estes et al. |
| 4,308,133 A | 12/1981 | Meyer |
| 4,347,118 A | 8/1982 | Funk et al. |
| 4,490,259 A | 12/1984 | Coffing |
| 4,512,872 A | 4/1985 | Chung et al. |
| 4,589,980 A | 5/1986 | Keys |
| 4,592,826 A | 6/1986 | Ganguli |
| 4,596,651 A | 6/1986 | Wolff et al. |
| 4,612,113 A | 9/1986 | Kallionen |
| 4,676,889 A | 6/1987 | Hsieh et al. |
| 4,678,561 A | 7/1987 | Keys |
| 4,678,562 A | 7/1987 | Keys |
| 4,702,487 A | 10/1987 | Stoian et al. |
| 4,722,782 A | 2/1988 | Graham et al. |
| 4,724,272 A | 2/1988 | Raniere et al. |
| 4,744,890 A | 5/1988 | Miller et al. |
| 4,846,964 A | 7/1989 | Scott et al. |
| 4,859,317 A | 8/1989 | Shelfantook et al. |
| 5,044,552 A | 9/1991 | Becker et al. |
| 5,084,160 A | 1/1992 | Stewart et al. |
| 5,143,598 A | 9/1992 | Graham et al. |
| 5,176,802 A | 1/1993 | Duyvesteyn et al. |
| 5,223,148 A | 6/1993 | Tipman et al. |
| 5,236,577 A | 8/1993 | Tipman et al. |
| 5,295,665 A | 3/1994 | Mackie |
| 5,389,274 A | 2/1995 | Fernandez |
| 5,443,158 A | 8/1995 | McKenney et al. |
| 5,485,883 A | 1/1996 | Rippetoe et al. |
| 5,520,799 A | 5/1996 | Brown et al. |
| 5,534,136 A | 7/1996 | Rosenbloom |
| 5,538,081 A | 7/1996 | Rippetoe et al. |
| 5,554,301 A | 9/1996 | Rippetoe et al. |
| 5,626,743 A | 5/1997 | Humphreys |
| 5,626,793 A | 5/1997 | Reiffenrath et al. |
| 5,670,056 A | 9/1997 | Yoon et al. |
| 5,670,345 A | 9/1997 | Srivastava et al. |
| 5,702,612 A | 12/1997 | Wang |
| 5,728,202 A | 3/1998 | Nelson et al. |
| 5,795,466 A | 8/1998 | Kelebek et al. |
| 5,798,137 A | 8/1998 | Lord et al. |
| 5,849,201 A | 12/1998 | Bradley |
| 5,872,289 A | 2/1999 | Appleby et al. |
| 5,876,592 A | 3/1999 | Tipman et al. |
| 5,896,435 A | 4/1999 | Gautier et al. |
| 5,961,786 A | 10/1999 | Freel et al. |
| 5,968,349 A | 10/1999 | Duyvesteyn et al. |
| 5,992,050 A | 11/1999 | Kemper et al. |
| 6,007,709 A | 12/1999 | Duyvesteyn et al. |
| 6,036,849 A | 3/2000 | Rippetoe et al. |
| 6,074,558 A | 6/2000 | Duyvesteyn et al. |
| 6,106,787 A | 8/2000 | Rippetoe |
| 6,214,213 B1 | 4/2001 | Tipman et al. |
| 6,320,148 B1 | 11/2001 | Yoon et al. |
| 6,352,639 B2 | 3/2002 | Ito et al. |
| 6,427,843 B1 | 8/2002 | Clark |
| 6,514,310 B2 | 2/2003 | Allemand et al. |
| 6,589,417 B2 | 7/2003 | Taciuk et al. |
| 6,595,163 B2 | 7/2003 | Dumaz et al. |
| 6,764,542 B1 | 7/2004 | Lackey et al. |
| 6,768,015 B1 | 7/2004 | Luxem et al. |
| 6,793,079 B2 | 9/2004 | Khan et al. |
| 6,822,105 B1 | 11/2004 | Luxem et al. |
| 6,827,786 B2 | 12/2004 | Lord |
| 6,827,841 B2 | 12/2004 | Kiser et al. |
| 6,871,743 B2 | 3/2005 | Yoon et al. |
| 6,936,227 B1 | 8/2005 | De Souza et al. |
| 6,965,044 B1 | 11/2005 | Hammond et al. |
| 6,989,091 B2 | 1/2006 | Jorgensen |
| 7,008,528 B2 | 3/2006 | Mitchell et al. |
| 7,011,749 B2 | 3/2006 | Hayes et al. |
| 7,018,435 B1 | 3/2006 | Wentinck |
| 7,097,675 B2 | 8/2006 | Detering et al. |
| 7,384,557 B2 | 6/2008 | Phillips et al. |
| 7,438,807 B2 | 10/2008 | Garner et al. |
| 7,464,756 B2 | 12/2008 | Gates et al. |
| 7,585,407 B2 | 9/2009 | Duyvesteyn |
| 7,588,682 B2 | 9/2009 | Norman |
| 7,618,597 B2 | 11/2009 | Duyvesteyn |
| 7,625,466 B2 * | 12/2009 | Yeung .................. 196/46 |
| 7,811,444 B2 | 10/2010 | Duyvesteyn et al. |
| 7,909,989 B2 * | 3/2011 | Duyvesteyn et al. ......... 208/390 |
| 7,988,847 B2 | 8/2011 | Duyvesteyn et al. |
| 7,998,342 B2 | 8/2011 | Duyvesteyn |
| 8,062,503 B2 | 11/2011 | Freel et al. |
| 8,277,642 B2 | 10/2012 | Ryu |
| 8,454,821 B2 * | 6/2013 | Chakrabarty et al. ......... 208/45 |
| 8,701,470 B2 * | 4/2014 | Feimer et al. .............. 73/61.75 |
| 2005/0070218 A1 | 3/2005 | Phillips et al. |
| 2008/0242875 A1 | 10/2008 | Hong et al. |
| 2009/0145809 A1 | 6/2009 | Ledbetter et al. |
| 2010/0089800 A1 * | 4/2010 | MacDonald et al. ......... 208/390 |
| 2011/0180459 A1 * | 7/2011 | Duyvesteyn et al. ......... 208/391 |
| 2011/0198091 A1 * | 8/2011 | Sirota et al. .................. 166/310 |
| 2012/0048781 A1 * | 3/2012 | Wu et al. ...................... 208/390 |
| 2012/0048782 A1 * | 3/2012 | Wu et al. ...................... 208/390 |
| 2012/0091041 A1 * | 4/2012 | Diefenthal et al. ........... 208/390 |

OTHER PUBLICATIONS

Biodiesel Processing, biodiesel Handout for 2005 New Hampshire Science Tearher's Association Workshop UNH Biodiesel Group, http://www.unh.edu/p2/biodiesel, 2005 (27 pp.).

Cohen et al., "Degradation of Coal by Fungi Polyporus Versicolor and Poria Monticola," Appl. Enviorn. Microbiol., 44(1):23-27, Jul. 1982 (5 pp.).

Desolventizer-Toaster, Crown Iron Works Company, PDF file created Feb. 16, 2010, (3 pp.).

Flores III, Heavy Oil Upgrading, Technology Today, Spring 2010 (6 pp.).

Gallmetzer et al., "Efflux of Organic Acids in *Penicillium simplicissimum* is an Energy-Spilling Porcess . . . ," Microbiology 148:1143-1149, 2002 (7 pp.).

Hong et al., "A Polar-Nonpolar, Acetic Acid/Heptane, Solvent Medium for Degradation of Pyrene by Ozone," Ind. Eng. Chem. Res. 43:7710-7715, 2004 (6 pp.).

Houdaille, "Jet Pump Techinical Data—Pumping Liquids," pp. 1-11, 1982 (12 pp.).

International Search Report, PCT/US2010/62133, Aug. 30, 2011 (3 pp.).

International Search Report, PCT/US10/43822, Nov. 29, 2010 (4 pp.).

International Search Report, PCT/US10/43082, Sep. 14, 2010 (11 pp.).

International Search Report and Written Opinion, PCT/US09/35552, Apr. 17, 2009 (8 pp.).

International Search Report and Written Opinion, PCT/US07/19222, Apr. 28, 2008 (8 pp.).

International Search Report, PCT/US2005/34092, Jul. 26, 2007 (6 pp.).

International Search Report, PCT/US2006/08263, Oct. 23, 2006 (5 pp.).

International Search Report, PCT/US2005/36728, Aug. 8, 2006 (8 pp.).

Lewis, "Liquefied Petroleum Gas," Hawley's condensed Chemical Dictionary (14th Edition), John Wiley Sons. , 2002 (1 p.).

Rogoff et al., "The Microbiology of Coal," Bureau of Mines, U.S. Dept. of the Interior, Region V, Bruceton, PA, 73:264-268, Aug. 23, 1956 (5 pp.).

Soygold, Environmental Solutions to Your Market Challenges, http://www.soygold.com/applications.htm, printed Mar. 6, 2007 (2 pp.).

Toluene MSDS, Sigma-Aldrich, Apr. 24, 2012 (8 pp.).

Vicente et al., "A Comparative Study of Vegetable Oils for Biodiesel Production in Spain," Energy & Fuels, 20:394-398, 2006 (published on Web Nov. 8, 2005) (5 pp.).

Sinnott, R. K., Chemical Engineering Design, vol. 6, 4th ed., p. 402, Elsevier, 2005 (2 pp.).

\* cited by examiner

METHODS OF TRANSPORTING VARIOUS BITUMEN EXTRACTION PRODUCTS AND COMPOSITIONS THEREOF

This application claims priority to U.S. Provisional Application No. 61/502,031, filed Jul. 28, 2011, the entirety of which is hereby incorporated by reference.

BACKGROUND

Many traditional bitumen extraction processes, such as hot water bitumen extraction, use paraffinic solvent as a carrier liquid to transport extracted bitumen material. As a result, many bitumen extraction facilities are specifically designed for handling and processing compositions of bitumen and paraffinic solvent. For example, pipelines and distillation columns used in some traditional bitumen extraction facilities are tailored for being used with paraffinic solvent having bitumen dissolved therein.

The recent development of new bitumen extraction technologies, such as those described in U.S. Pat. No. 7,909,989, have resulted in the need for bitumen extraction facilities to have the capability to handle other solvents used as carrier mediums for bitumen. For example, the bitumen extracted in the methods described in the '989 patent are dissolved in an aromatic solvent. Accordingly, some modern bitumen extraction facilities must now consider ways in which different solvents having bitumen dissolved therein can be economically and efficiently transported and subjected to downstream processing.

Many of the proposed solutions to this issue are not economic or efficient. For example, one proposed solution is to provide an entirely new infrastructure designed for handling and processing the bitumen-laden aromatic solvent and which is used in conjunction with separate infrastructure designed for handling bitumen-laden paraffinic solvent. Such new and separate systems can include an entirely separate set of pipelines for and separate distillation towers used solely for the separation of aromatic solvent from bitumen. Such a solution is not desirable due to added cost and complexity of such a system. Another proposal has been to operate an existing system in shifts, whereby the existing equipment is alternated between processing the bitumen-laden paraffinic solvent and the bitumen-laden aromatic solvent. Not only does this proposed solution add expense and complexity to the system, but also slows down the overall rate at which the facility can operate. Still another proposal has been to separate the bitumen from the aromatic solvent and mix it with paraffinic solvent so that it can be joined with the bitumen-laden paraffinic solvent produced by the hot water extraction techniques. Such a solution would drastically increase the operating cost of the process and would have a negative impact on the environment due to the $CO_2$ emissions associated with separating the aromatic solvent from the bitumen. Additionally, the asphaltene content in the bitumen separated from the aromatic solvent would subsequently precipitate when added with the paraffinic solvent, which can lead to equipment clogging and other issues.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a method for transporting bitumen extraction products includes providing a first composition comprising bitumen and aromatic solvent; providing a second composition comprising bitumen and paraffinic solvent; and blending the first composition and the second composition.

In some embodiments, a blended bitumen extraction product composition is prepared by a method including the steps of providing a first composition comprising bitumen and aromatic solvent; providing a second composition comprising bitumen and paraffinic solvent; and blending the first composition and the second composition.

In some embodiments, a blended bitumen extraction product includes from 40 to 70 wt % bitumen; 2 to 50 wt % aromatic solvent; and 15 to 35 wt % paraffinic solvent.

Various advantages can be achieved from the methods and compositions described above. The embodiments summarized above use existing infrastructure, such as existing pipelines and distillation towers, rather than requiring dedicated equipment for the composition of aromatic solvent and bitumen. Accordingly, capital expenditures are minimized. Operating expenditures are also minimized by avoiding the need for separate distillation steps to separate aromatic solvent from bitumen. Correspondingly, $CO_2$ emissions are minimized by avoiding the need for additional distillation steps. Additionally, because a relatively small amount of aromatic solvent and bitumen is blended with the composition of paraffinic solvent and bitumen, the pipeline transportation specifications (e.g., viscosity, API, stability) based on bitumen-laden paraffinic solvent are still met. The above described embodiments also adequately address any concerns related to asphaltene precipitation. The bitumen carried by the aromatic solvent includes asphaltenes. If the bitumen were separated from the aromatic solvent and then added to paraffinic solvent, the asphaltene content would precipitate and could lead to equipment clogging and other issues. However, when the bitumen material remains with the aromatic solvent, the subsequent addition to the bitumen-laden paraffinic solvent does not result in asphaltene precipitation due to the continuing presence of the aromatic solvent in the blended composition.

These and other aspects of the present system will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

Figure 2:
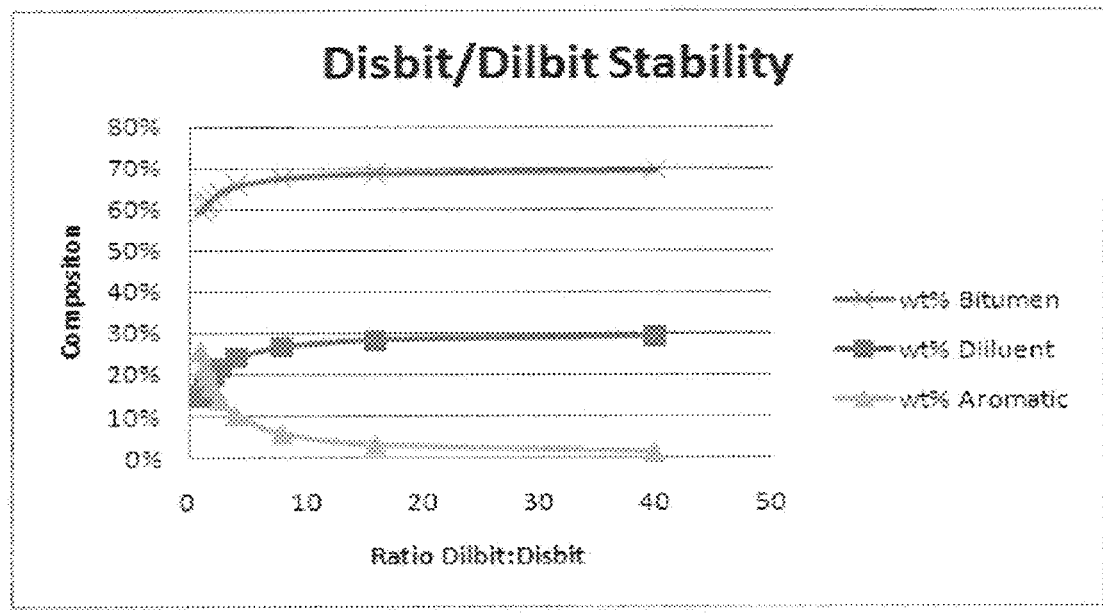

FIG. 1 is a flow chart illustrating steps of a method of transporting various bitumen extraction products according to embodiments described herein; and FIG. 2 is a graph showing blended composition stability over a first composition:second composition ratio of from 1:1 to 1:40.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense. Weight percentages provided herein are on a dry weight basis unless otherwise indicated.

With reference to FIG. 1, a method for transporting bitumen extraction products includes a step 100 of providing a first composition of bitumen and aromatic solvent, a step 110 of providing a second composition of bitumen and paraffinic solvent, and a step 120 of blending the first composition and the second composition. The first and second compositions can be products from different bitumen extraction methods, and can be blended together as a single blended composition in order to provide for more efficient and economical transportation of the two different bitumen extraction products.

In step 100, a first composition of bitumen and aromatic solvent is provided. In some embodiments, some or all of the bitumen will be dissolved in the aromatic solvent, including the asphaltene component of the bitumen. The first composition can be that obtained from performing solvent extraction on bituminous material, such as oil sands or tar sands. Any solvent extraction technique that uses aromatic solvent to extract bitumen from bituminous material can be used to produce the first composition. In some embodiments, the solvent extraction technique is similar or identical to any of the double solvent extraction embodiments described in U.S. Pat. Nos. 7,909,989, 7,985,333, and 8,101,067, and U.S. application Ser. Nos. 12/512,758, 12/560,964, 12/648,164, 12/692,127, 12/956,701, 12/964,612, 13/418,044, and 61/425,048, each of which is hereby incorporated by reference in its entirety. Generally speaking, the double solvent extraction techniques described in these applications involve the use of an aromatic solvent to extract bitumen from a bituminous material in a first step, followed by adding a second solvent to the bituminous material in order to remove residual aromatic solvent and residual bitumen from the bituminous material. The first step provides a composition of aromatic solvent having bitumen dissolved therein, which can be used as the first composition provided in step 100.

The aromatic solvent in the first composition can be any aromatic solvent suitable for use in extracting bitumen from bituminous material. In some embodiments, the aromatic solvent is a commercially available aromatic solvent, such as Solvesso 100 or Solvesso 150, manufactured by ExxonMobil Chemical. In some embodiments, the aromatic solvent is a light end fraction of bitumen material or a product derived from the distillation of bitumen or crude oil that has the desired aromatic content. The light end fraction of bitumen material can include the portion of the bitumen material having a boiling point temperature less than 250° C. In some embodiments, this light end fraction is sourced from bitumen material that is extracted from the same bitumen extraction and processing system where the method described herein is carried out. For example, bitumen material in a blended composition can be transported through pipelines to facilities where the bitumen can be separated into multiple hydrocarbon fractions (such as through the use of a distillation tower). One of the separated hydrocarbon fractions can be the light end fraction that is then used in the aromatic solvent bitumen extraction processes that can produce the first composition.

In some embodiments, different types of aromatic solvent can be used in the first composition, such as by using both a light end bitumen fraction and a commercial solvent such as Solvesso 100 or Solvesso 150. In some embodiments, the aromatic solvent bitumen extraction technique produces a composition of bitumen and aromatic solvent, and additional aromatic solvent is added to the composition in order to provide a first composition having the desired amount of bitumen and aromatic solvent. For example, a light end fraction of bitumen can be added to the bitumen-laden aromatic solvent resulting from the aromatic solvent bitumen extraction process to result in a first composition as described herein. In some embodiments, the solvent used in the first composition has an aromaticity in the range of from 60 to 90%. For example, the light end bitumen fraction that can be used as the aromatic solvent can have an aromaticity in this range.

The ratio of bitumen to aromatic solvent in the composition is generally not limited, and in some embodiments will depend on the bitumen extraction technique used to produce the first composition, including what specific steps are included in the method, what materials are used in the method, whether the method is carried out in a countercurrent fashion, and whether multiple iterations of the method are carried out in order to produce a more bitumen-laden first composition. In some embodiments, the first composition generally includes from 40 to 60 wt % bitumen, and from 60 to 40 wt % aromatic solvent. In some preferred embodiments, the ratio of bitumen to aromatic solvent in the first composition is around 50:50.

In some embodiments, the first composition can include other materials. Other materials that may be present in the first composition include water and solid particles, such as sand and clay. In embodiments where the first composition is obtained from carrying out solvent extraction processes on bituminous material, the first composition can undergo various separation techniques designed to minimize or eliminate the amount of non-bitumen, non-aromatic solvent material. Suitable separation techniques include but are not limited to filtering, screening, and decanting. In some embodiments, less than 3 wt % of the first composition is non-bitumen, non-aromatic solvent material. In some embodiments, the first composition includes less than 400 ppm suspended solids.

In step 110, a second composition is provided, the second composition including bitumen and paraffinic solvent. In some embodiments, some or all of the bitumen will be dissolved in the paraffinic solvent. Due to the use of paraffinic solvent, which can precipitate asphaltenes dependent on dilution, the second composition may have reduced asphaltene content (in the scenario where precipitated asphaltene is removed from the composition) or will include asphaltene, but a portion of which will be in a precipitated state. For example, the paraffinic solvent can precipitate half of the 18% asphaltene included in a typical Athabasca region bitumen.

In some embodiments, the bitumen component of the second composition is obtained from performing hot water bitumen extraction techniques on bituminous material, such as oil sands or tar sands. Hot water bitumen extraction techniques are well known to those of ordinary skill in the art and, in some geographic areas, are the most commonly used methods for extracting bitumen from bituminous material. The method generally involves adding hot water to bituminous material, agitating the material to create a bitumen froth, separating the bitumen froth from the agitated material, and separating the bitumen from the bitumen froth.

In some previously known hot water extraction techniques, the separated bitumen produced by the methods is not pipelineable. In order to make the bitumen pipelineable, solvent can be added to the bitumen to provide a diluted bitumen stream that can be transported through pipelines. In some instances, the solvent added to the bitumen is a paraffinic solvent. Accordingly, in some embodiments, the second composition stream is obtained from the hot water extracted bitumen that is mixed with paraffinic solvent to make it pipelineable.

The paraffinic solvent in the second composition can be any paraffinic solvent suitable for use in diluting bitumen in the process to meet desired specification and to make the bitumen material pipelineable. In some embodiments, the paraffinic solvent is a mixture of pentanes and hexanes. The composition can be a complex mixture of n-pentanes/hexanes and cyclo-pentanes/hexanes depending on the source distillation.

The ratio of bitumen to paraffinic solvent in the second composition is generally not limited provided the ration of bitumen to paraffinic solvent makes the resulting mixture pipelineable. In some embodiments, the second composition generally includes from 60 to 80 wt % bitumen and from 20 to 40 wt % paraffinic solvent.

In some embodiments, the second composition can include other materials. Other materials that may be present in the second composition include water and solid particles, such as sand and clay. The second composition can undergo various separation techniques designed to minimize or eliminate the amount of non-bitumen, non-paraffinic solvent material. Suitable separation techniques include but are not limited to filtering, screening, and decanting. In some embodiments, less than 3 wt % of the second composition is non-bitumen, non-paraffinic solvent material.

In step 120, the first composition provided in step 100 and the second composition provided in step 110 are blended together to form a blended composition. Any manner of blending the first composition and the second composition can be used. The blending can be carried out in a separate blending that vessel that may optionally include blades or baffles for promoting mixing between the first and second composition. In some embodiments, the blending of the first composition and the second composition involves adding the first composition to a pipeline through which the second composition is being transported, which may contain an in-line static mixer. In some embodiments, the blending is carried out using a pump station.

The ratio of first composition and second composition can be any ratio at which the blended composition is stable and significant asphaltene precipitation does not occur. In some embodiments, the ratio of first composition to second composition is in the range of from 1:1 to 1:40. With reference to FIG. 2, the graph shows that over a wide range of first composition to second composition ratios (i.e., 1:1 to 40:1 mass ratio), no asphaltene precipitation is identified after a 24 hour contact period. The dilbit referred to in FIG. 2 is from MPC's Canton Refinery—Cold Lake Bitumen. The Disbit referred to in FIG. 2 is primary disbit from a pilot plant near Reno, Nev. that carried out a double solvent extraction process. Asphaltene precipitation can be a concern because while the asphaltene component of the bitumen will not precipitate in aromatic solvent, it can precipitate in paraffinic solvent. However, as shown in FIG. 2, the presence of the aromatic solvent in the blended composition tends to keep asphaltene in solution despite the presence of the paraffinic solvent.

In some embodiments, additional aromatic and/or paraffinic solvent can be added to the blended composition in order to further adjust the content of the blended composition. The addition of aromatic and/or paraffinic solvent can be carried out for a variety of reasons, including making further adjustments to the API and viscosity of the blended composition so that it is pipelinable or, in the case of adding aromatic solvent, to further ensure the asphaltene content of the blended composition does not precipitate.

Once the first composition and second composition are combined, the blended composition can include bitumen, aromatic solvent, and paraffinic solvent in varying content ranges depending on the relative production rates of the first composition to the second composition, but will generally include from 50 to 70 wt % bitumen, from 2 to 50 wt % aromatic solvent, and from 15 to 35 wt % paraffinic solvent. In some embodiments, the blended composition will also have an API greater than 19 and a viscosity less than 350 cSt, which helps to ensure that the blended composition meets the specifications of the pipelines through which it may be transported.

In some embodiments, the methods described herein further include the steps of transporting the blended composition through a pipeline. Any pipeline suitable for use in transporting a composition of solvent and bitumen can be used. In some embodiments, the transporting of the blended composition is provided so that the blended composition can be transported to facilities where further processing of the blended composition can be carried out. Further processing can include, for example, separating solvent from the bitumen and upgrading the bitumen material.

Separation of the solvent from the bitumen can be carried out using any technique known to those of ordinary skill in the art for separating solvent from bitumen material. In some embodiments, the separation of the solvent is carried out using distillation towers. The specific type of distillation tower used can be dependent on the solvents used in the compositions, and can include the use of atmospheric and/or vacuum distillation towers. In some embodiments, a series of distillation towers are used in order to separate the two different solvents contained in the blended composition. For example, a first atmospheric distillation tower can be used to separate a first solvent, followed by using a vacuum distillation tower to separate a second solvent.

Once the bitumen is separated, the bitumen can be subjected to upgrading processing to convert the heavy, viscous bitumen into more commercially useful, lighter hydrocarbon material. Any suitable upgrading techniques can be used. In some embodiments, the upgrading is carried out using a nozzle reactor, such as the nozzle reactor described in U.S. Pat. No. 7,618,597, which is hereby incorporated by reference in its entirety.

Unless otherwise indicated, all numbers or expressions, such as those expressing dimensions, physical characteristics, etc. used in the specification are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A method for transporting bitumen extraction products comprising:

providing a first composition comprising bitumen and aromatic solvent wherein the first composition comprises from 40 to 60 wt % bitumen and from 60 to 40 wt % aromatic solvent;

providing a second composition comprising bitumen extraction products and paraffinic solvent wherein the second composition comprises from 60 to 80 wt % bitumen and from 20 to 40 wt % paraffinic solvent;

blending the first composition and the second composition, wherein the first composition and the second composition are blended at a first composition:second composition ratio of from 1:1 to 1:40; and comprising transporting the blended composition through a pipeline.

2. The method as recited in claim 1, wherein the first composition is derived from a double solvent bitumen extraction process performed on oil sands.

3. The method as recited in claim 1, wherein the aromatic solvent is Solvesso 100, Solvesso 150, a light end of the bitumen, or a product derived from the distillation of bitumen or crude oil which has the desired aromatic content.

4. The method as recited in claim 1, wherein the paraffinic solvent is pentane.

5. The method as recited in claim 1, further comprising: separating the aromatic solvent and the paraffinic solvent from the bitumen; and upgrading the bitumen.

6. A blended bitumen extraction product composition prepared by a method comprising:

providing a first composition comprising bitumen and aromatic solvent, wherein the first composition comprises from 40 to 60 wt % bitumen and from 60 to 40 wt % aromatic solvent;

providing a second composition comprising bitumen extraction product and paraffinic solvent, wherein the second composition comprises from 60 to 80 wt % bitumen and from 20 to 40 wt % paraffinic solvent;

blending the first composition and the second composition, wherein the first composition and the second composition are blended at a first composition:second composition ratio of from 1:1 to 1:40.

7. The blended bitumen extraction product as recited in claim 6, wherein the first composition is derived from a double solvent bitumen extraction process performed on oil sands.

8. The blended bitumen extraction product as recited in claim 6, wherein the paraffinic solvent is pentane.

9. The blended bitumen extraction product as recited in claim 6, wherein the aromatic solvent is Solvesso 100, Solvesso 150, a light end of the bitumen, or a product derived from the distillation of bitumen or crude oil which has the desired aromatic content.

* * * * *